US006564547B1

(12) United States Patent
Potma

(10) Patent No.: US 6,564,547 B1
(45) Date of Patent: May 20, 2003

(54) DEVICE FOR DIGITAL HYDRAULIC PRESSURE TRANSFORMATION (DHPT)

(75) Inventor: Theordorus Gerhardus Potma, Kaag (NL)

(73) Assignee: T. Potma Beheer, B.V., Kaag (NL)

( * ) Notice: Subject to any disclaimer, the term of this patent is extended or adjusted under 35 U.S.C. 154(b) by 0 days.

(21) Appl. No.: 09/582,299

(22) PCT Filed: Dec. 24, 1998

(86) PCT No.: PCT/NL98/00734

§ 371 (c)(1),
(2), (4) Date: Aug. 15, 2000

(87) PCT Pub. No.: WO99/34100

PCT Pub. Date: Jul. 8, 1999

(30) Foreign Application Priority Data

Dec. 24, 1997 (NL) ............................................ 1007912

(51) Int. Cl.[7] ............................................ F16D 31/02
(52) U.S. Cl. ................................ 60/413; 91/35; 91/448
(58) Field of Search ............................ 91/441, 35, 454, 91/448; 60/413, 418, 430, 469

(56) References Cited

U.S. PATENT DOCUMENTS 2,551,274 A * 5/1951 MacDuff .................... 92/98 R
3,470,692 A * 10/1969 Kamp ......................... 60/469
3,717,995 A * 2/1973 Case ........................... 60/413
3,811,795 A 5/1974 Olsen
3,918,847 A * 11/1975 Junck et al. .................. 60/413
3,943,973 A 3/1976 Zettergren
4,389,167 A * 6/1983 Farr ........................... 660/413
4,541,241 A * 9/1985 Schulze ........................ 60/413
4,870,892 A * 10/1989 Thomsen et al. ............. 91/454
5,313,795 A * 5/1994 Dunn .......................... 60/413
5,743,992 A * 4/1998 Weimer et al. ............... 60/413

FOREIGN PATENT DOCUMENTS

DE 4000185 7/1990
GB 2006327 5/1979
JP 09014202 1/1997
WO WO96/32576 10/1996

* cited by examiner

*Primary Examiner*—Edward K. Look
*Assistant Examiner*—Igor Kershteyn
(74) *Attorney, Agent, or Firm*—Williams, Morgan & Amerson

(57) ABSTRACT

The object of the invention is to provide a device for digital hydraulic pressure transformation with low loss, intended for flow—and power control for hydraulic machines, particularly hydraulic cylinders, which via a switching device are connected to a pressure reservoir with constant high pressure. According to the invention an intermediate mass is present between the switching device and the hydraulic machine which mass is activated by the flowing medium, the intermediate mass being of such size that the average velocity of the flow in the pipe during the open period of the switching device is sufficiently low to bring the hydraulic medium into the hydraulic machine so slowly, that the pressure change at the location of the hydraulic machine is smaller than the pressure difference between the reservoir and the momentary pressure at the location of the hydraulic machine, as result of which a gradual stepwise rising or lowering of said pressure level is made possible.

18 Claims, 11 Drawing Sheets

DEVICE FOR DIGITAL HYDRAULIC PRESSURE TRANSFORMATION (DHPT)

Figure 1:
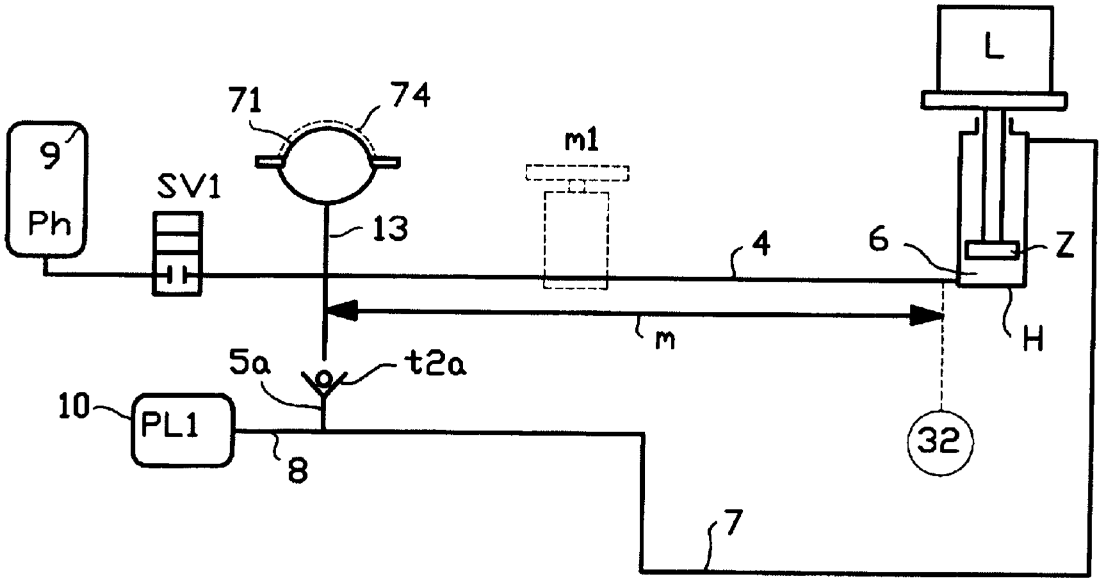

The invention relates to a device for low power loss control and flow control for hydraulic machines particularly for hydraulic cylinders, which are fed from a reservoir with constant or semi constant high pressure. Such a situation for instance occurs in case of a so-called free piston engine which pumps up hydraulic medium from a pressure accumulator with low pressure of for instance 10 bar to a pressure accumulator with high pressure of for instance 400 bar, in which the hydraulic machine is connected between the low and high pressure tank.

In many cases the hydraulic machine is connected through a throttle valve. With a low load of the machine and as a result a low necessary pressure difference over the machine the pressure difference over the machine is adjusted by throttling in the valve. In this simple and cheap device however, a very high throttling loss occurs especially with low load.

In case of a hydro engine connected to the high pressure reservoir use can be made of an adjustable engine in which the oil volume taken in per revolution can be varied. With low load of the engine the control sets a small volume as a result of which a very small quantity of energy and a small drive torque is supplied per revolution. In this way a low loss adjustment to the capacity to be supplied can be realised. In hydro engines which cannot be adjusted and in particular with hydro cylinders, however, this way of controlling is impossible.

A control with low loss can also be achieved by transforming high pressure into low pressure with the help of an analogue pressure transformer consisting of an adjustable hydro pump driven by an adjustable hydro engine. With low load of the hydraulic machine the hydro engine is adjusted here to a small volume and the pump to a high volume per revolution. As a result a small volume of high pressure is supplied to the engine from the high pressure reservoir and converted or transformed to a much larger volume with low pressure which is supplied from the pump to the machine. Controlling with such an analogue pressure transformer or simplified varieties thereof such as the integrated analogue pressure transformer described in patent application PCT/NL97/00084 dated Feb. 24, 1997 gives small losses but is also relatively costly because the hydro engine/pump combination will always be a costly mechanical precision part of the device.

Known as well is the control of capacity and flow with the help of quick-working valves which work intermittently and during adjustable short periods of time admit the high pressure medium to the machine. In this way for instance a quick-working valve can supply oil intermittently to a lift cylinder with which a load can be lifted. When the valve is connected to a pressure reservoir of for instance 400 bar and the lift cylinder is loaded with a small load, which for instance causes a static pressure of 50 bar in the cylinder, the fluid will under influence of a large pressure difference of 400–50 bar flow in very fast when the valve opens. In a valve of small dimensions an unwanted throttle loss occurs here. In a valve of large dimensions the oil volume in question in the cylinder will almost immediately be compressed to the applied pressure of 400 bar. When the oil volume in question in the cylinder is for instance two liters, approximately 60 cc of oil will have to flow in as a result of the oil compression. When the valve closes now a relatively large quantity of energy is stored in the cylinder at that moment under the influence of which the load will start to move with large acceleration. As a result of this movement the oil in the cylinder will expand and the pressure will drop. At a certain moment the load will subsequently reach it maximum velocity in which the pressure has dropped again to 50 bar. After that the load will move under influence of its mass inertia in which the pressure in the cylinder drops further to below the pressure level of the low pressure reservoir to which the cylinder is connected via a non-return valve. The fluid will now flow from the low pressure reservoir to the cylinder via the non-return valve, which cylinder will decelerate relatively slowly under influence of its own weight until the velocity is zero and reverses sign and the load will slowly come down until the pressure in the cylinder has reached the level of 50 bar again. The load is now lifted over a length which as a rule will be much too large for the fine-tuned control which is nearly always required.

In order to lift the load in smaller steps much less oil has to be supplied from the quick switching valve per opening period. To that end said open period has to be reduced to such extreme short values that this cannot be obtained anymore or only obtained with much difficulty with the existing large dimensioned valves. In addition the valve then has to close at a moment on which the velocity of the fluid through the valve is very large, so that in order to prevent substantial loss of flow an extreme high closing speed is required. In addition a cavitation problem arises because the sudden breaking off of the fast flowing flow of fluid creates a vacuum directly behind the valve, as a result of which gas bulbs are formed in the fluid. At admitting high pressure again, these gas bulbs will implode at high speed, which leads to loss of energy and wear of material as a result of fatigue.

Although such known controls in principle are simple and cheap, in many cases, especially when used with machines with a large oil volume in question such as hydraulic cylinders, they are nonetheless accompanied by losses that are too large and they require quick working valves which according to the state of the art often do not match the requirements made to a satisfactory and fine-tuned control with a sufficiently low price in combination with low losses.

The problems mentioned and the losses that occur in the control with the help of fast working valves are prevented or reduced by the device according to the invention.

In this device an intermediate mass that is present is accelerated by the high pressure admitted during the open period of the quick switching valve, after which during the subsequent closed period of the quick switching valve said mass passes on its kinetic energy via the hydraulic medium to the oil volume in question at the entrance of the hydraulic machine and to the hydraulic machine itself.

According to a second aspect of the invention new digital quick switching valves are provided with which very short open or closed periods can be realized. This makes it possible to limit the quantity of oil per supply pulse and to dose it well, as a result of which a gradual pressure rise and gradual pressure drop of the pressure of the oil volume in question of the machine can be realized with little losses.

According to a third aspect of the invention the occurrence of cavitation in the control according to the invention is prevented by using an anti-cavitation accumulator (ACA), which will be elucidated in the following.

Said intermediate mass may consist of the mass of a fluid column between the quick switching valve and the machine, or of the mass of a mass moving or rotating along with this fluid column, for instance the rotation mass of a hydro engine accommodated in the supply pipe to the hydraulic machine, provided with a flywheel or not. To that end, in general a very simple type of hydro engine can suffice. The intermediate mass present in cooperation with the digital quick switching valve and the anti cavitation accumulator form a device for digital hydraulic pressure transformation (DHPT) which in the manner shown transforms the high pressure in the supply tank to a controllable average lower level at the location of the hydraulic machine. This device for digital hydraulic pressure transformation is, in comparison to the known means and devices, a compact and relatively cheap and low-loss means for capacity control and flow control for in particular hydraulic machines with a large volume in question of fluid such as hydraulic cylinders.

In order to realise such a device for digital hydraulic pressure transformation or "DHPT device", hydraulic valves and switches are required which work rapidly and which:

can switch a flow of fluid in a low loss manner;

are relatively cheap and can be operated with control signals of little energy.

In addition is desirable that means are present to prevent cavitation.

The necessary valves, switches and anti-cavitation means are part of the device for digital hydraulic pressure transformation (DHPT) according to the invention.

In the simplest case the moving intermediate mass is the fluid mass in the intermediate pipe between the quick switching valve and the hydraulic machine. With a pipe length of for instance 4 meters and an cross-sectional surface of 1 $cm^2$ that mass is 400×1×0.8 gram mass or 0.32 kilogram mass. With a sudden allowed pressure of for instance 300 bar the average acceleration of this fluid mass is approximately equal to 10000 m/sec2. After 1 and 2 milliseconds, respectively, the average fluid velocity in the pipe concerned is 10 and 20 meters per second. In order to limit the speed, bearing flow losses in mind, to acceptable values, the quick switching valve concerned therefore has to close the high pressure connection after about 2 to 3 milliseconds. This requires unusual high speed of switching which nonetheless can be obtained with the switches and the digital valves according to the invention. In addition, according to the invention it is possible to artificially increase the mass in question by incorporating a hydro engine in the supply pipe which engine is or is not provided with a flywheel. As a result of such a provision the fluid acceleration can be lowered with for instance a factor ten as a result of which the switching speed of the valve in question can be lowered and/or the energy of the supply pulse be reduced in favour of a more fine-dosed control of the average flow velocity to the hydraulic machine.

A good working of the device according to the invention subsequently requires that the danger of cavitation is prevented. In the device according to the invention this danger of cavitation is averted with the help of a so-called "ACA", an "anti-cavitation accumulator". This accumulator is characterized in that the pressure generated by the accumulator at the fluid exit, cannot exceed a certain maximum and in that a pre-pressure is equal at the most to the lowest system pressure on the spot and in that the support of the accumulator membrane, in case of membrane accumulator, is at the gas side of the accumulator. As a result of these characteristics the accumulator membrane does not start to move until the fluid pressure at the fluid side of the membrane becomes lower than the lowest system pressure. This fluid side is connected to the space in which cavitation may occur, the cavitation being prevented because the fast expansion of the gas volume prevents the fluid pressure to become lower than the critical value of about 0.4–0.6 bar absolute. The ACA according to the invention in fact functions as a permanently present artificial gas bulb with a certain minimum volume and a certain maximum gas pressure, which at strong reduction of pressure in the fluid expands and as a result prevents too strong pressure reductions in the fluid pressure medium. Possible too quick a reduction of this artificial gas bulb at the rising again of the pressure can be prevented by throttling the gas or fluid flow from or to the ACA, respectively, in a known manner with help of for instance a non-return valve bridged by a restriction.

The invention will be elucidated in the following on the basis of the following figures:

FIGS. 1 and 1*a*–1*e*: Switches for digital hydraulic pressure transformation (DHPT) in different load situations.

FIGS. 2*a*–2*f*: DHPT switches in which the single quick switching valve (SV) are replaced by valve combinations (OD).

FIGS. 3 and 3*a*–3*d*: Embodiments of the valve combination (OD) and of the quick switching valves (SV).

FIG. 4*a*–4*h*: Embodiments of the anti-cavitation accumulators (ACA).

In FIG. 1 an elementary DHPT switch is given for a simple situation with one-sided static load of a lift cylinder H with a relatively large oil volume in question 6. On the basis of said switch first the DHPT principle is further elucidated. It is also indicated how the ACA is connected with which cavitation in the intermediate pipe 4 can be prevented. The intermediate mass m here consists of the mass of the fluid in the supply pipe 4. This intermediate mass can be increased with the help of hydro engine m1, which rotates together with the flow of mass m, which engine is indicated by dots in the figure. When with the quick switching valve SV1 extreme short open periods can be realized, the small intermediate mass, consisting of the fluid mass only, will nonetheless be sufficient, as a result of which a simple and cheap DHPT device is created.

When a constant speed of the piston Z is desired while it is loaded with a low weight L, an average modest pressure difference over the piston will have to be maintained, which will have to be much lower than the available pressure difference between the pressure Ph in the high pressure accumulator 9 and the low pressure PI1 in the low pressure accumulator 10. This average low pressure difference is obtained with short supply pulses and relatively long closing pulses of the quick switching valve SV1, in which the fluid velocity despite the large pressure difference over the supply pipe 4, remains limited nonetheless. Per opening pulse only a small quantity of fluid is supplied to the cylinder as a result of which the pressure rise in the cylinder per supply pulse is small and the increase of the piston speed as well. The pressure rise per supplied quantity of oil depends on the oil volume 6 in question in the cylinder and could possibly be adjusted with an additional oil volume which can be switched on or not, or with a gas-filled accumulator 32. In hydraulic cylinders the oil volume in question generally is large to very large (larger than for instance 10 liters), in hydro engines the oil volume in question is small to very small.

In the cylinder a pressure level is created which on average is on a level sufficient to overcome the weight of the load L on the piston. The pressure variations occurring, certainly with a large oil volume in question, are very small in principle but unwanted nonetheless because as a result vibrations may occur. The lowest pressure variations occur when the opening pulses are unusually short and the oil volume in question is relatively large so that the speed in the pipe and the pressure in the cylinder per supply pulse cannot rise high. In the DHPT device according to the invention therefore useful use is made of the characteristics of the oil volume in question present. With a very low oil volume in question like with a hydro engine, the pressure in the supply pipe and at the entrance of the hydro engine will rise to Ph extremely quickly. Virtually rectangular pulses between PI1 and Ph will then occur. In this case as well it is important to keep the pressure pulses as short as possible because the speed variations of the piston or the hydro engine that occur as a result become larger at increased pulse length. As said before the oil volume in question could possibly be artificially increased here with an accumulator or oil volume 32 in order to thus reduce the pressure pulsations. A short supply pulse is especially at low load of importance because as a result of the large pressure difference between Ph and an average relative low pressure to be maintained in the cylinder or hydro engine, high fluid accelerations occur in the supply pipe to the cylinder or (with a small oil volume in question) large accelerations at the output shaft of the hydro engine.

In order to prevent that the pressure drops too much after closing the quick switching valve SV1, with the danger of cavitation as a result of underpressure in the supply pipe, the ACA is indicated in FIG. 1. The gas side of this accumulator is in open connection here to the outside air with atmospheric pressure Pa via the porous or perforated support plate 11. This pressure is exerted via the accumulator membrane on the fluid at the exit of the quick switching valve SV1. As a result cavitation is prevented. The pressure PI1 for instance is 10 bar as a result of which the ACA is filled again to the pressure PI1 from the low pressure accumulator 10 with pressure Pl1. After the ACA has been filled the pressure in the pipe 4 further rises to the pressure level in the cylinder H.

It is desirable that the ACA is filled again, and the membrane therefore abuts the support plate again, before a new high pressure pulse is admitted to the supply pipe 4. The latter in order to prevent that the membrane (in the absence of further provisions which decelerate the flow of fluid to the accumulator) abuts the support plate at high speed.

In the illustrative calculation below of the necessary ACA volume a gas pre-pressure in the ACA of 1 bar and a lowest system pressure of for instance 10 bar, available on the spot from a low pressure tank present, is taken as starting point (also see FIGS. 4*a*–4*d*). In a pipe length of the pipes 8 and 5 between the low pressure tank 10 and the ACA of for instance 0.6 meter, the average fluid acceleration in this pipe is approximately equal to (10−1):(0.06×0.8)×g meters per sec2=1875 meters per sec2. The fluid velocity then rises per millisecond with about 1.875 meters per second and the total supply to the ACA after 1, 2, 3, 4 and 5 milliseconds respectively, with a cross-section of the pipe of 4 $cm^2$, is 0.36, 1.50, 3.38, 6 and 9.38 $cm^3$, respectively.

Taking as starting point a fluid velocity in the intermediate pipe 4 also supply pipe to the hydraulic machine of 20 m/s (average over the pipe length) directly after closing the quick switching valve obtained after 2 milliseconds, said fluid velocity will subsequently decrease with a deceleration determined by the pressure difference over the fluid column in the supply pipe 4. With an average pressure of for instance 50 bar at the location of the hydraulic machine and a pressure of 1 bar in the ACA and a fluid mass of 4×100×8 grams or 0.32 kg the deceleration is (50−1):(0.4×0.8)×g meters per sec2=about 1400 m/sec2 or about 1.4 m/sec per millisecond. The velocity of the fluid after 1, 2, 3, 4, and 5 milliseconds, respectively, is then 18.6- 17.2- 15.8- 14.4 and 13 m/sec, respectively, and the desired fluid supply to the beginning of the supply pipe then amounts 0.5×(20+18.6)× 100×0.001 cc=about 1.9 cc, 3.7 cc, 5.3 cc, 6.9 cc and 8.2 cc, respectively.

When we compare this to the supplied amount of fluid from the low pressure accumulator 10 then the shortage that has to be supplied by the ACA is 1.54 cc, 2.2 cc, 1.92 cc, 0.9 cc and −1.18 cc, respectively. This means that the ACA has to supply a maximum of 2.2 cc and that after about 4.5 milliseconds, the supply from the low pressure accumulator has become equal to the desired supply. With a relatively very small ACA with a gas volume of for instance 5 cc and the pre-pressure of 1 bar the needs can therefore already be met.

With the device of FIG. 1 it is possible to let the load rise with adjustable speed. The lowest rising speed occurs with supply pulses that are as short as possible and very low pulse frequency. Subsequently first the pulse frequency is raised and after that for instance the pulse length AND the pulse frequency. Of great importance often is the possibility of a fine-dosed minimal speed. This possibility for fine dosing can be raised if so desired by increasing the intermediate mass m with the indicated means but also by providing the pipe 4 with a parallel pipe with small diameter, which can be switched to. The supply then takes place via that pipe with small diameter as a result of which per supply pulse the fluid quantity supplied to the cylinder becomes smaller and the possibility for fine dosing is increased.

Figure 1A:
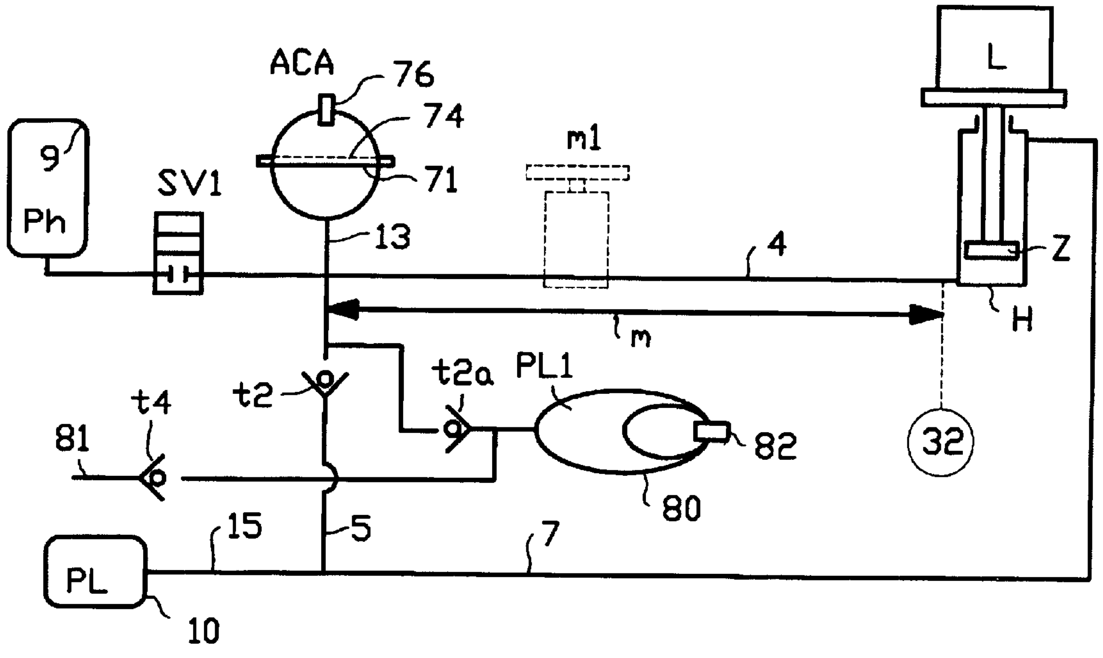

In FIG. 1*a* two low pressure levels PI1 and PI are present, in which the lowest pressure PI is for instance atmospheric. This means that PI is too low to initially feed pipe 4 via pipe 15 and 5 after closing SV1. Therefore the pressure level PI1 is also necessary with a pressure of for instance 10 bar. This pressure is always built up during the open period of valve SV1 by filling the small auxiliary accumulator 80. For filling said auxiliary accumulator use can for instance be made of the supply pulse, during which under influence of the pressure rise in pipe 4 for instance a small auxiliary piston is enforced which always during the open period pumps up fluid from the pressure tank with low or atmospheric pressure PI to the auxiliary accumulator 80 with pressure PI1.

After closing SV1 at the end of each supply pulse the pipe 4 is first mainly filled from the ACA subsequently mainly from the auxiliary accumulator 80 in a manner as described with FIG. 1 and after that (after pressure and fluid velocity in pipe 4 and in the auxiliary accumulator 80 have sufficiently dropped to below the atmospheric level) from the low pressure tank 10 of the system with pressure PI. The gas pressure in the ACA here is always lower than PI, because otherwise the ACA cannot be filled from the atmospheric low pressure tank, but high enough to prevent cavitation. For that reason the gas side of the ACA here is not connected to the outside air but closed off and provided with a gas filling valve with which the ACA can be brought to a suitable pre-pressure of for instance 0.7 bar.

Figure 1B:
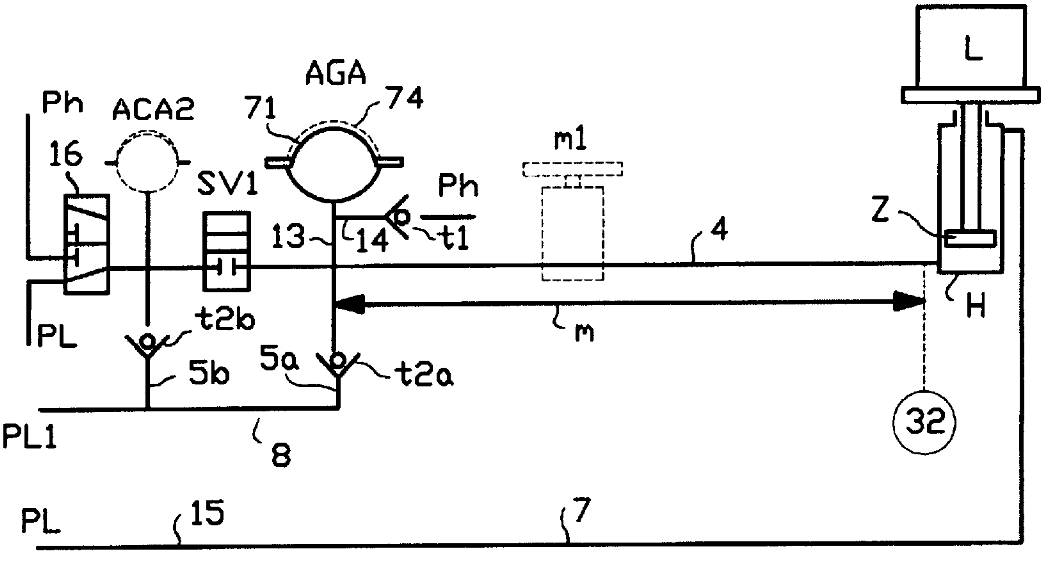

In FIG. 1*b* FIG. 1*a* is extended with valve 16 with which the entrance of the valve SV1 can be connected to high pressure Ph or low pressure PI (or PL1). By connecting SV1 to PL1 the load L can controllably be lowered with little loss. The loss is small due to the fact that the potential energy of the load is mainly stored in the high pressure tank 9 with pressure Ph via pipe 14 with non-return valve t1. The working of the device now is as follows.

When the pipe 1 is connected to low pressure PI by valve 16 the pipe 4 is connected to low pressure during the open period of the valve SV1. As a result the intermediate mass m in pipe 4 is accelerated under the influence of the pressure in lift cylinder H, fluid starting to flow from the cylinder and the load L dropping. When the speed of the fluid in pipe 4 has reached the maximum speed allowed the quick switching valve SV1 is closed. The fluid moving to the left the escapes to the high pressure tank with pressure Ph via the pipe 14 with non-return valve t1. The potential energy of the load is therefore first converted into kinetic energy of the intermediate mass m and said kinetic energy is subsequently passed on to the high pressure tank. In order to prevent cavitation in pipe 1 at the sudden closing of valve SV1 it is necessary to connect the low pressure tank to valve 16 via a short and broad pipe 1 and possibly to arrange a second ACA 2 as shown in the figure.

Figure 1C:
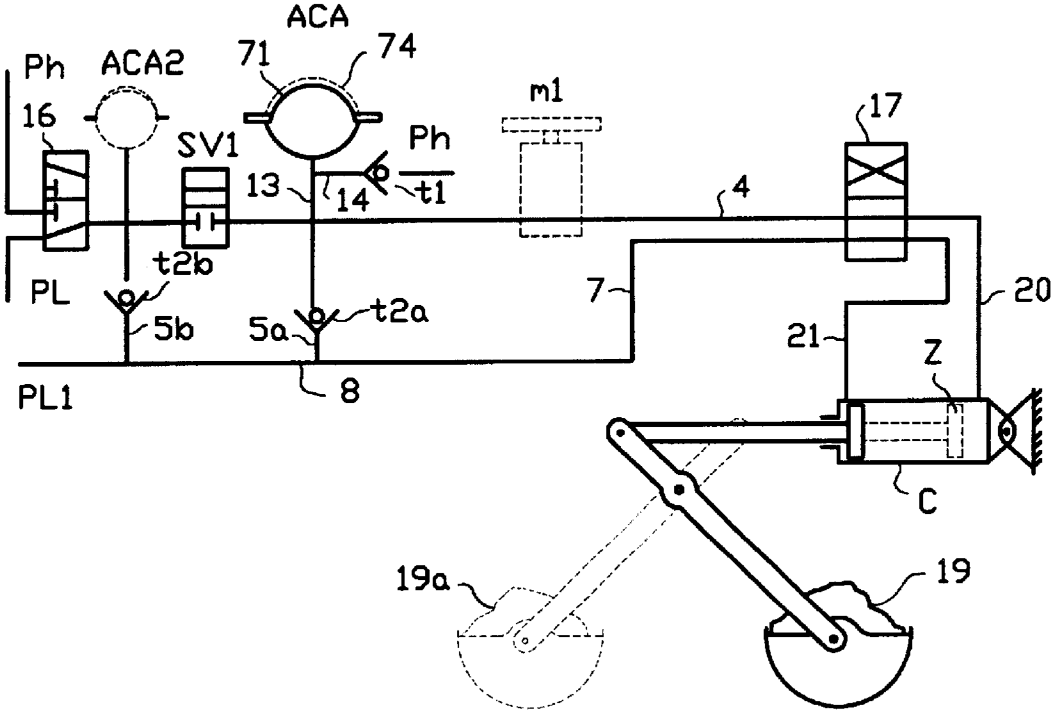

In FIG. 1*c* a situation is shown with double-sided static load of a hydro cylinder. The working corresponds to the FIGS. 1, 1*a* and 1*b*. Valve 17 is a switch valve with which the direction of movement of the cylinder C can be reversed. In the load situation depicted, high pressure is necessary in pipe 20 in order to keep the loading shovel with the load L lifted. In the situation indicated by dots with the loading shovel on the left-hand side pressure is necessary in pipe 21 to keep the load lifted. The reversal of the load situation takes place with low frequency and in general in these kind of situations is controlled by the operator, in which valve 17 may have a low switching speed.

Figure 1D:
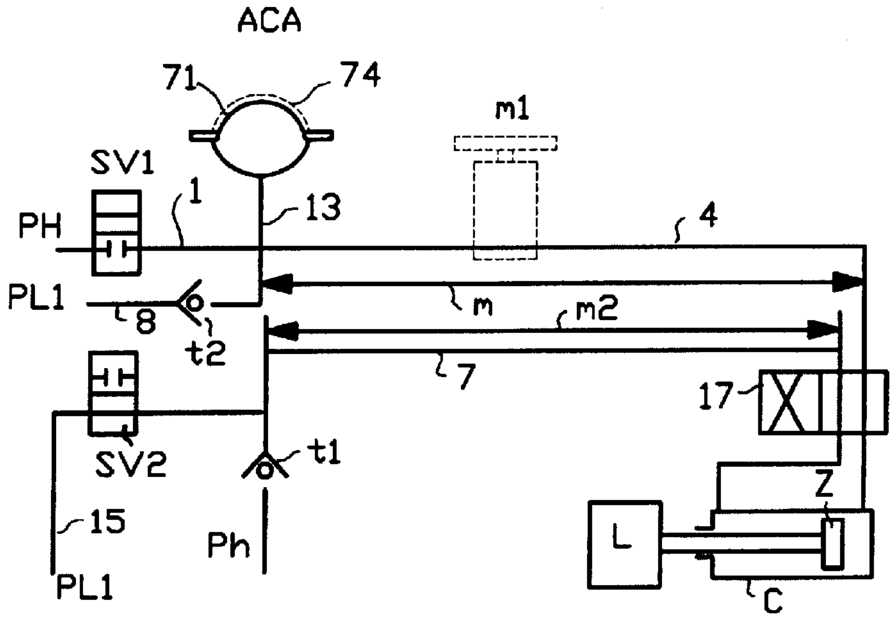

In FIG. 1*d* a double-sided dynamic load situation is indicated. The load L is accelerated and decelerated many times here with a high switching speed and switching frequency. Decelerating the load L cannot take place in this case under the influence of the weight of load L but the connections of the hydraulic machine would have to be switched to that end again and again. Instead of a very quick and high frequent switching four-way valve 17 a slow switching four-way valve 17 is present here with additionally a quick switching valve SV2 in the return pipe 7 and 15.

The valve SV2 can close the discharge 7, 15 very short and can ensure closing pulses or closed periods of which the length can be adjusted from extremely short to unrestrictedly long. This extension makes it possible to decelerate the cylinder C (or instead of this a hydro engine) in a controlled manner, for instance in situations in which the load of the hydraulic machine may vary strongly. The valve SV2 in the discharge 7 is necessary here because when the load falls away the control may indeed close the supply via the valve SV1 but the machine cannot be decelerated with it.

By closing SV2 the flowing fluid in pipe 7 is suddenly stopped. As a result an immediate pressure rise in discharge 7 occurs near the valve SV2. The pressure rise maximally rises to Ph after which non-return valve t1 opens and return supply takes place to the high pressure reservoir with pressure Ph. The fluid mass m2 in pipe 7 is then decelerated and the pressure in the oil volume left of the piston Z rises because the piston keeps moving to the left with the lowering discharge via pipe 7. As a result of the rising pressure the piston Z and the load L are decelerated. The moment the fluid mass or intermediate mass m2 has come to a standstill in intermediate pipe 7, SV2 can be opened again. The intermediate mass is now accelerated to the left under the influence of the pressure difference between the pressure in the cylinder and the pressure Pl1. After the fluid column or the intermediate mass b has come at speed again, a new closing pulse is generated which generates again a pressure rise in the cylinder and further decelerates the load. In this deceleration process therefore the kinetic energy of the load L is converted into speed of the intermediate mass m2 and the energy of the intermediate mass m2 is subsequently almost completely converted in supply of hydraulic energy to the high pressure tank with pressure Ph. In a long closing pulse of SV2 the pressure in the cylinder rises quickly to Ph after which at maximum deceleration the kinetic energy of the load L is immediately and almost completely converted into useful supply to the high pressure tank.

As a result of the presence of the intermediate mass m2 therefore a gradual building-up of the deceleration pressure in the left side of the cylinder C is possible and expansion loss can be prevented or minimized.

Figure 1E:
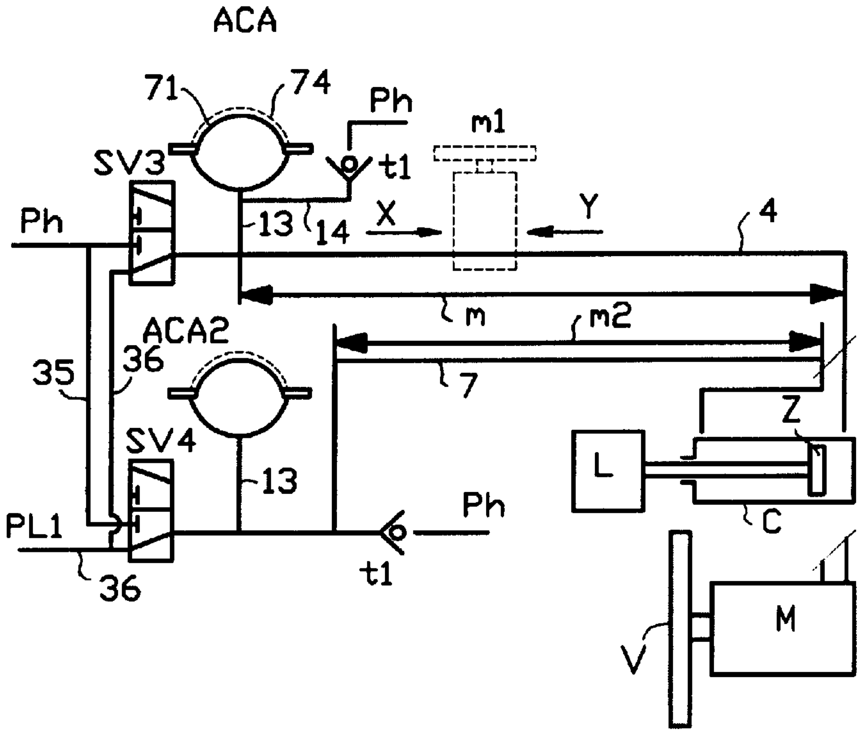

In FIG. 1*e* a switch is shown in which only two quick switching valves SV3 and SV4 are worked with, whereas a complete control in two directions of movement is possible. The valves SV3 and SV4 are constructed here as switch valves. The working of the combination as depicted is as follows.

In the depicted situation the connected cylinder or hydro engine can move freely because the pipes 4 and 7 are connected to each other via the pipe 36. This pipe 36 is also connected to the low pressure tank with pressure Pl1 (or Pl). When the valve SV3 is moved downwards, the supply pipe 1 is connected to pipe 4 to the hydraulic machine. The piston Z is now going to move to the left. After closing SV3 pipe 4 is connected again to Pl1 and the machine will, under influence of the mass inertia effect, move on. As soon as SV4 is now moved downwards, pipe 7 connects to Ph via pipe 35-1 as a result of which the machine decelerates in the manner described before. Coming to a standstill after deceleration, the machine can subsequently be accelerated in reversed direction y. The working and the use of the ACA's in comparison to the preceding figures applies here as well.

Figure 2A:
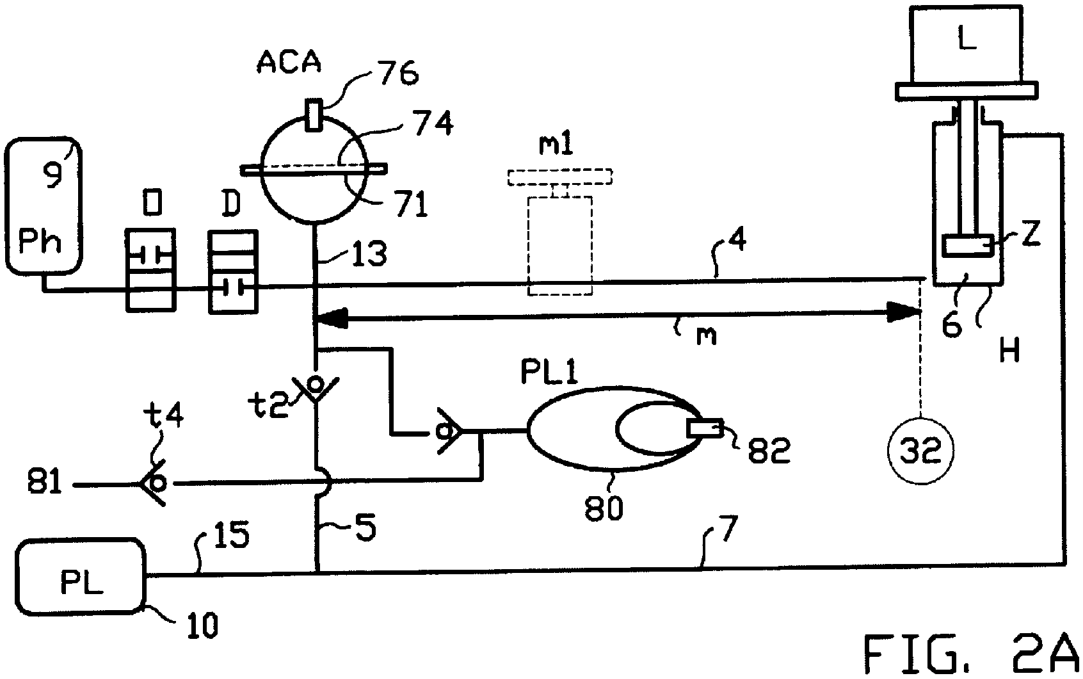
Figure 3:
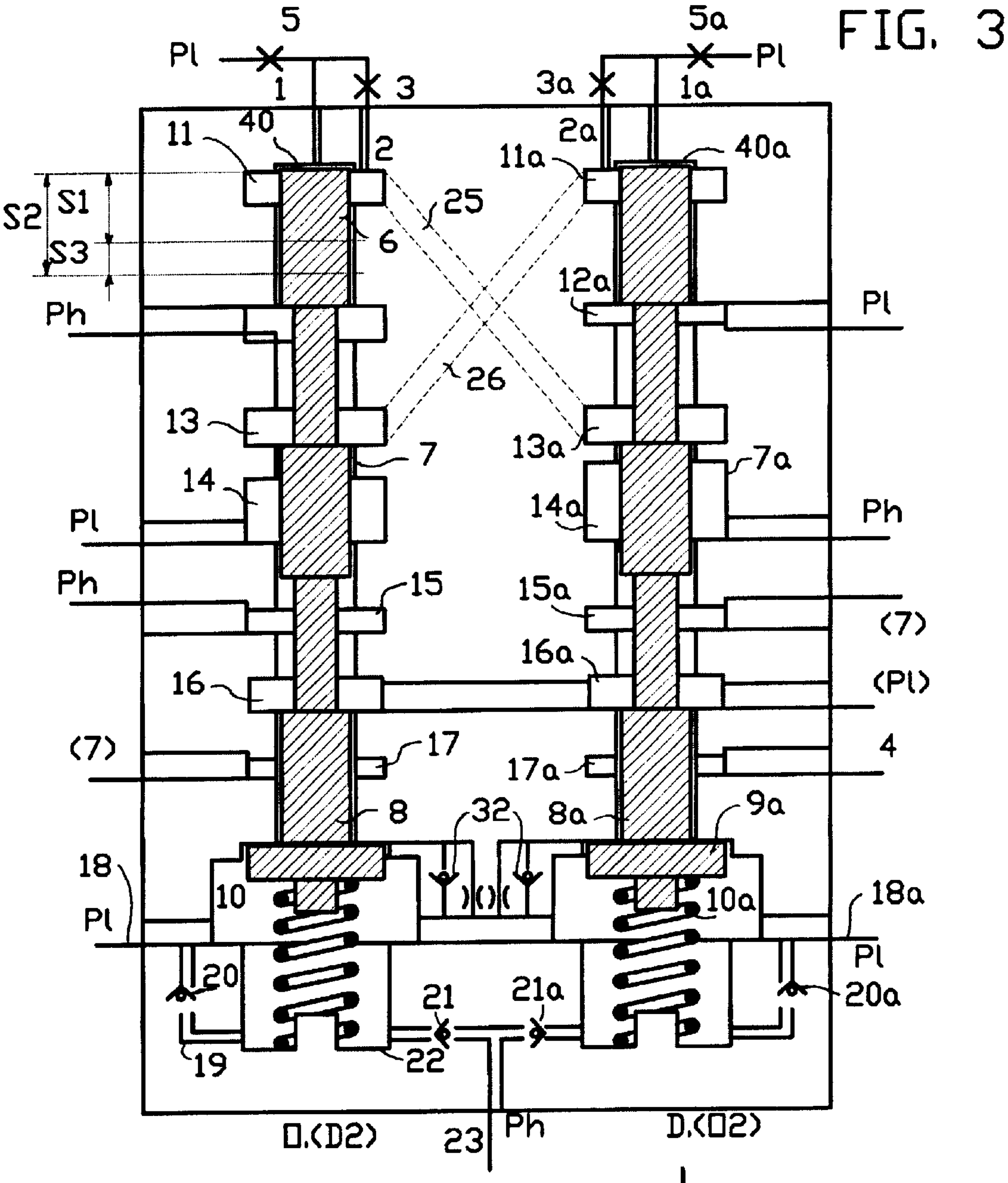

In FIG. 2*a* it is indicated how the switching device up until now consisting of one or more quick switching valves SV such as SV1 from FIG. 1*a*, may also consist of two valves O and D, which are elaborately described and elucidated with the FIGS. 3. Here O is a valve which in the first or starting position is open so that flow through the valve can take place and which can close very quickly. D is a valve which in the first or starting position is closed but which can open very quickly. The two valves O and D here together replace the hydraulic quick switching valve SV1. In the starting position the supply pipe is closed because D is closed and the piston Z of the hydro cylinder M stands still. As soon as valve D is opened the pressure in the supply 1, 2 and 4 will rise under the influence of the high pressure Ph, and the fluid in the supply pipe 4 will be accelerated very strongly. The mass of the fluid in the pipe 4 here forms the intermediate mass m. As a result of the supply to the cylinder the pressure of the oil volume in question 6 in the cylinder H increases and a pressure difference arises over the piston Z, as a result of which the piston starts to move.

At the end of the open period valve O is closed as a result of which the supply is broken off. Subsequently D is closed and after that O is opened again, with which the starting situation is restored. In this way a supply pulse of variable length and frequency is created. Because D can open very quickly, in 1 to a few milliseconds, and O can close very quickly (and very shortly or long after that) a rectangular switch characteristic is possible with very little throttling loss. The valves O and D can be energized in various ways and started as described in the description of the FIGS. 3. The valves O and D described there can open or close very quickly under the influence of an electric signal of little energy. In order to reach the starting position again, however, these types of valves require a relatively longer time of for instance 10 milliseconds. Because of the combination of two valves according to the invention an open period and thus a supply pulse or deceleration pulse of an extreme short pulse time, in principal reducible to nil, can be realised. The valves start their downward movement by admitting pressure above a adjustment plunger with the use of a very small control valve.

Figure 2B:
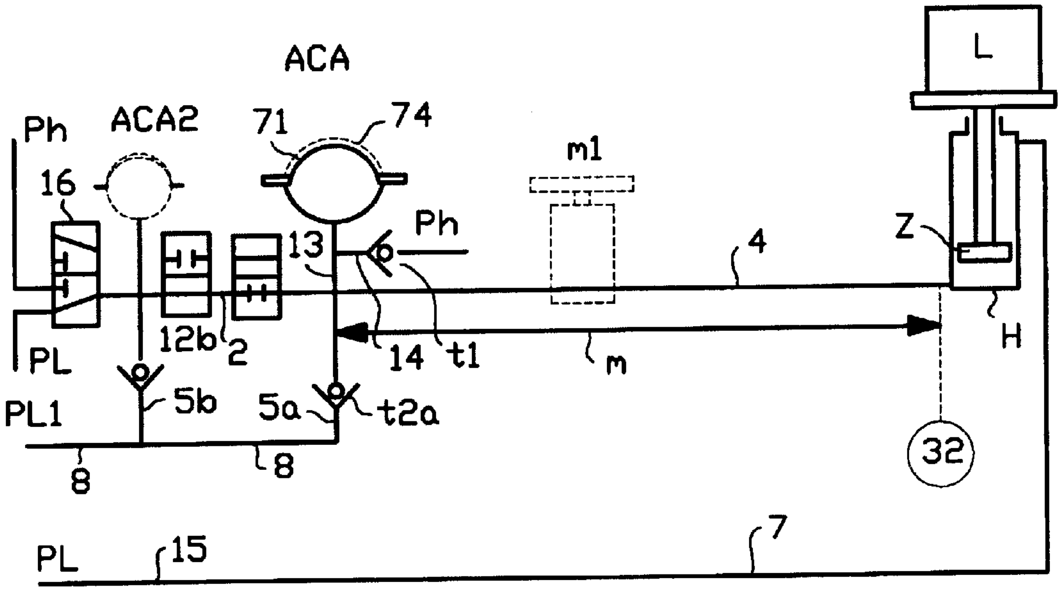
Figure 2C:
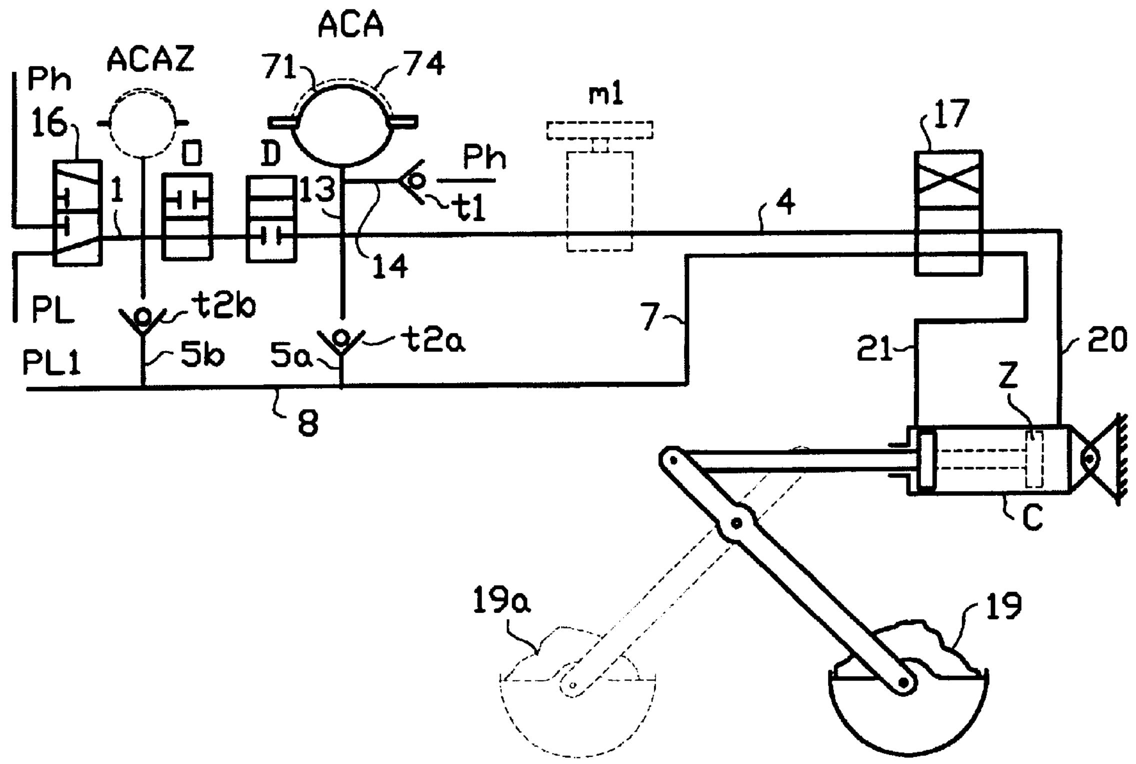

In FIG. 2*b* and FIG. 2*c* the valves SV1 from the FIGS. 1*b* and 1*c* are replaced by the valve combination OD.

Figure 2D:
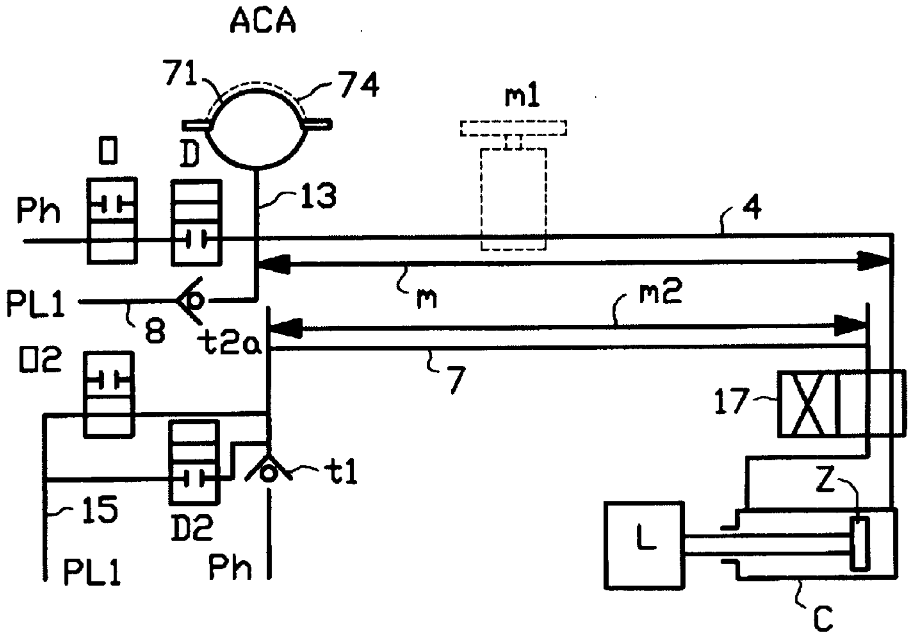

In FIG. 2*d* a situation is shown with double-sided dynamic load of a hydro cylinder C in which the valves SV1 and SV2 from FIG. 1*d* are replaced by the valve combinations OD and O2D2, respectively. A deceleration pulse or closed period for pipe 7 is realised by closing O2 and shortly after that opening D2, after which first O2 and subsequently D2 return to the starting position. The working of the valves O2 and D2 corresponds to the one of the valves O and D from the preceding figures.

Figure 2E:
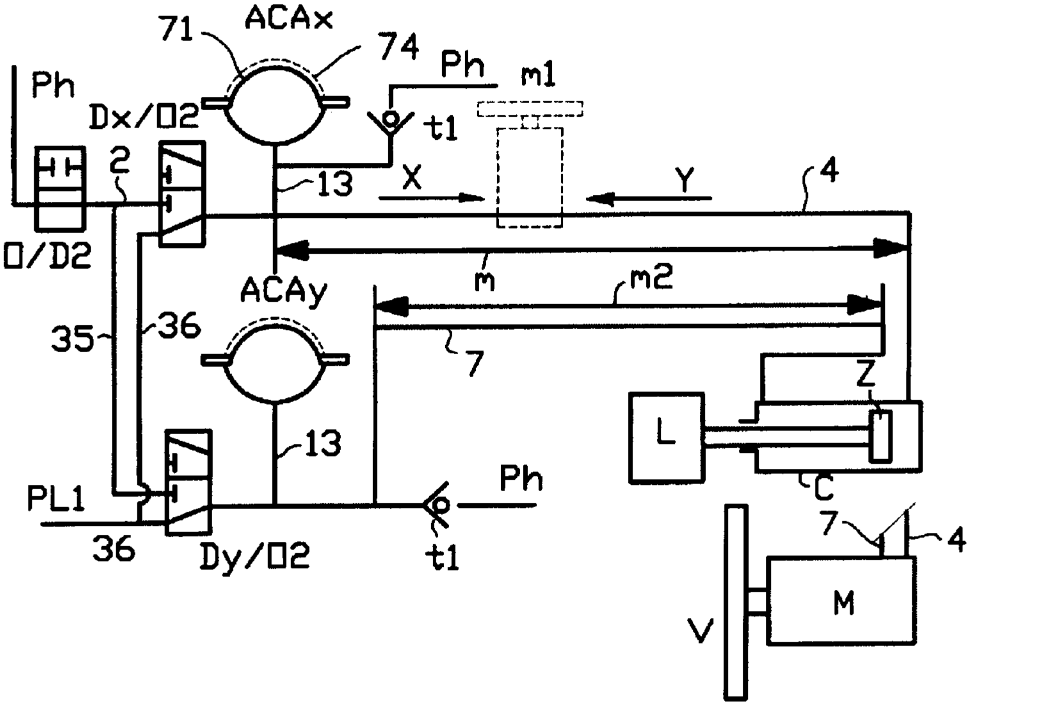

In FIG. 2*e* a switch is indicated in which a complete control in two directions of movement is possible with three valves. The valve O/D2 replaces the valves O and D2 from FIG. 2d. Valve Dx/O2 replaces the valve D from FIG. 2*d* for flow in the x-direction and also valve O2. Valve Dy/O2 replaces valve D from FIG. 2*d* for flow in the Y-direction and also valve O2. The valve Dx/O2 and Dy/O2 are switch valves here. The working of the depicted combination is as follows.

In the drawn position the supply and discharge pipes 4 and 7 of the cylinder C or hydro engine M are connected to each other via channels 36 and the hydraulic machine can move freely. Channel 36 is also connected to low pressure PI or PI1. Via valve OD2 the high pressure supply Ph is connected to the other two valves via pipe 35 but subsequently closed via the two valves Dx/O2 and Dy/O2. When valve Dx/O2 switches to the bottom position the high pressure Ph is connected to the hydro cylinder via channel 4. The oil now starts to flow in the direction x and the hydro cylinder will move to the left. The supply is stopped by switching the valve O/D2 to the bottom position, as a result of which the pipe 4 is closed off from the high pressure Ph. In this way a supply pulse is created in the flow direction x. Subsequently valve Dx/O2 and after that O/OD2 return to the starting position in the manner described earlier.

In order to decelerate the piston Z Dy/O2 is switched to the bottom position. The discharge 7 is then connected to Ph via pipe 35 and valve O/D2 as a result of which the intermediate mass m2 strongly decelerates and oil is supplied back counter to the pressure Ph via non-return valve t1. After this the switching of O/D2 follows. Pipe 7 is then closed via pipe 35, 2 and O/D2, the oil also being supplied back via the non-return valve t1 to Ph. Valve Dy/O2 subsequently returns to the starting position as a result of which pipe 7 is connected again to PI1 and to the supply 4 via 36 and DxO2. The deceleration pulse is therewith ended after which O/D2 also returns to the starting position.

To have the cylinder move to the right with flow direction y, Dy/O2 is switched to the bottom position from the starting position. Pressure oil with pressure Ph reaches the other side of the cylinder via O/D2, pipe 35 and pipe 7. This pressure pulse is ended by switching O/D2, after which first Dy/O2 and after that O/D2 return to the starting position.

In order to decelerate the piston Z which moves to the right, Dx/O2 is switched so that the oil flowing in the direction y via pipe 4, valve Dx/O2 and O/D2 is supplied back counter to the pressure Ph as a result of which the intermediate mass ml and the piston Z decelerate. This deceleration pulse comes to an end by switching O/D2 and switching Dx/O2 back to the starting position.

The valve configuration can therefore generate supply pulses and deceleration pulses to the left and to the right and control the flow in two directions.

Figure 2F:
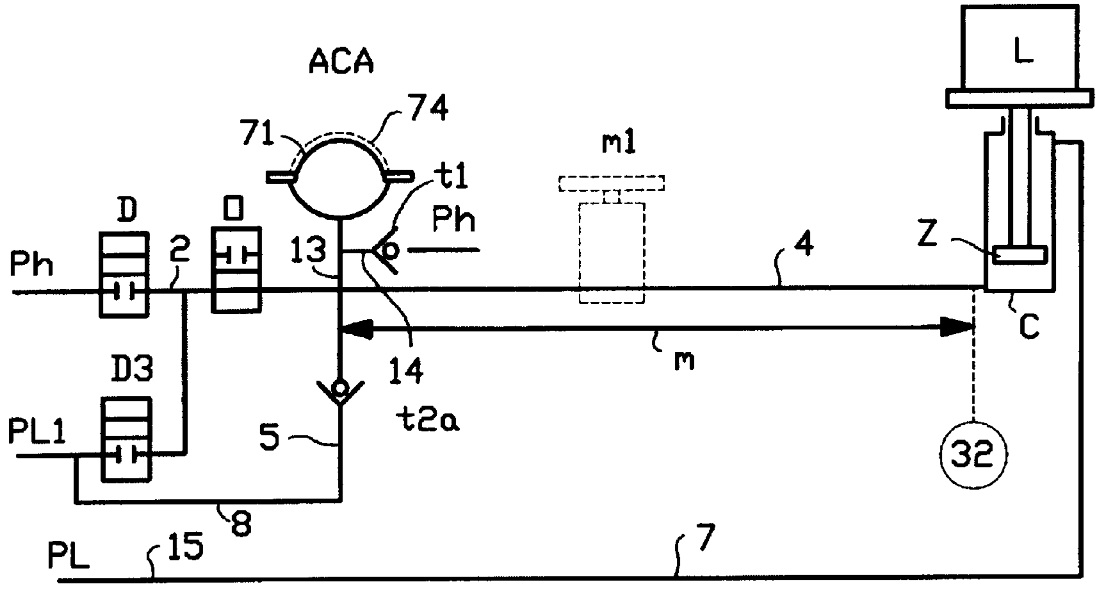

FIG. 2*f* gives an alternative for the switch of FIG. 2*b*. This switch makes quicker switching from lifting to lowering the load (or reversal of a connected hydro engine) possible. For lifting the load the combination O plus D is effective in the manner already described. For lowering the load the combination D3 plus O is functioning. Operating the three valves corresponds to the operation of the three valves from the preceding FIG. 2*e* and is further elucidated in the figure description of FIG. 3*c*.

FIG. 3 gives a practical constructive embodiment for the valve combinations O plus D and D2 plus O2. In the figure the left valve is O or D2 and the right valve D or O2. Here the mechanical design of the valves can be identical in principle. Vertically from top to bottom the adjustment plungers 6 and 6*a* can be distinguished which are necessary for the very quick downward valve movement. The plunger members 7 and 7*a* are part of the switch valves which act as switching valves for the return movement of the valves O and D via the channels 25 and 26, which provide the gates 11 and 11*a* with low pressure (pI, PI1) or high pressure Ph. When the right valve is down high pressure is supplied to the left adjustment plunger 6 and when the left valve is down the right adjustment plunger 6*a* comes under low pressure. The valves thus switch the pressure supply to each other, as a result of which only two valves will suffice.

The plungers 8 and 8*a* in the embodiment according to FIG. 3 are part of the actual main valve with which the fluid flows to and from the hydraulic machine are switched. In the series connection O-D from FIG. 2*a*,2*b*, 2*c* and 2*d* the gate 17*a* is connected to channel 4 and gate 15 to Ph. In the parallel connection O2-D2 of FIG. 2*d* the gates 17–16 or 15*a*–16*a* connect the channel 7 to the low pressure connection PI (or PI1).

The working of the valve combination is as follows. In the depicted starting position channel 26 is under high pressure Ph via the opened gate 13. Adjustment plunger 6*a* however will not move because gate 11 a is closed off by plunger 6*a*, and also the small quick electro valve 3*a* is closed. The electro valve 5*a*is open then and connects the space 40*a* above plunger 6*a* to low pressure PI. Leak-off oil which reaches the space 40*a* above the plunger from gate 11*a* is discharged via valve 5*a*which in the top or starting position connects the space above the adjustment plunger 40*a* to low pressure. The position of plunger 6*a* is stable as a result. As soon as from the depicted position the small electro valve 5*a* is closed and valve 3*a* is opened, plunger 6*a* starts moving and opens gate 11*a*. Plunger 6*a* will now move downwards very quickly as a result of supply of oil under high pressure via the broad channel 26. As a result the main valve is opened via the gates 16*a* and 17*a* and plunger 8*a* and a broad connection of Ph to channel 4 is created. The channel 25 to gate 11 is also brought under pressure Ph via gate 14*a* and 13*a* and plunger 7*a*, as a result of which the left valve is enforced. The valve body 6*a*-7*a*-8*a*-9*a* moves very quickly and switches during the working stroke S1. After that the buffer piston 9*a* closes the broad discharge via channel 18*a* from the buffer cylinder to PI. The buffer piston 9*a* is strongly decelerated after that, and during the buffer stroke S3 supply taking place from the buffer cylinder via valve 21*a* to Ph. The diameter of the buffer piston 9*a* is larger than the diameter of the driving plunger 6*a* and dimensioned such that the kinetic energy of the valve body at the end of a relatively short buffer stroke is mainly or entirely converted into useful return supply to Ph.

From the end of the working stroke S1 to the end of the entire stroke S2 the passage of Ph via gate 15, 16, 16*a* and 17*a* to channel 4 (see also FIGS. 1 and 2) is completely opened. This connection is broken off again when the left valve moves downwards. This happens as soon as the small electro valve 5 closes and 3 opens. Adjustment plunger 6 then starts to move and opens gate 11 to the broad channel 25 which is under pressure Ph. Plunger 7 closes gate 15 and thus the passage from Ph to channel 4.

In the bottom position of the left valve spool 6-7-8 channel 26 is connected to low pressure PI via gate 13. The spring 10*a* will now move the right valve body or valve spool 6*a*-7*a*-8*a* upwards. The connection of the gates 16*a* and 17*a* is then broken off by plunger 8*a* and channel 25 is switched to low pressure PI by plungers 6*a* and 7*a* (position as drawn). Spring 10 under buffer piston 9 can now move the left valve spool 6-7-8 upwards, after which channel 26 comes under pressure Ph again and the connection of gate 15 to gate 16 is opened again. The starting position is now reached again and the valve combination is ready to generate the next supply pulse.

The spring 10 and 10*a* from the figure description given above can be replaced by a plunger which is under permanent pressure and which exerts a constant upward force. The buffer piston can also be constructed such that the top and bottom displacement space are separated, the top space being connected to low pressure PI of for instance atmospheric level and the bottom space being connected to the low pressure PI1 of for instance 10 bar so that the valve spool of the valves O and D experiences a permanent upward force. The hydraulic medium with pressure PI1 can then freely flow to the bottom displacement space during the up-going stroke whereas during the down-going stroke the medium freely flows from said bottom displacement space to the pressure level PI1 during the first part S1 of the stroke, and during the buffer part S3 flows to the high pressure tank with pressure Ph via non-return valve 21 and 21*a*.

In order to realize the parallel connection of FIG. 2*d*, with the valves D2 and O2, only the gates of the main valves are connected differently. In the figure it is indicated in brackets how channel 7 and PI are connected. In the drawn starting position channel 7 is now connected to PI via the right valve. With the right valve spool in the bottom position that connection is closed and with the left valve spool in the bottom position as well that connection is opened again and the closing pulse is ended. The working of the valves further is identical to what has been described above.

The valve spools move back upwards under the influence of the springs 10 and 10*a* as soon as the pressure in the channels 25 and 26, respectively, goes to level PI. At the end of the up-going stroke the movement is buffered via the space above the pistons 9 and 9*a*.

The valves 3 and 5 are very small and as a result of that also very quick working electric on-off valves. Valve 5 and 5*a*can also be replaced by pressure operable valves which open when the pressure above the adjustment plungers 6 and 6*a* in pipe 1 and 1*a* drops below a low threshold value, and close as soon as the pressure in pipe 1 and 1*a* exceed a low threshold value again. Valve 5 in the drawn embodiment is necessary to prevent building-up of pressure taking place in the space above the adjustment plungers as a result of leakage from the channels 25 and 26 to the spaces 40 and 40*a* above the adjustment plungers 6 and 6*a*. During building-up of pressure the valve may switch spontaneous and unwantedly, and the top position of the adjustment plunger becomes instable.

Figure 3A:
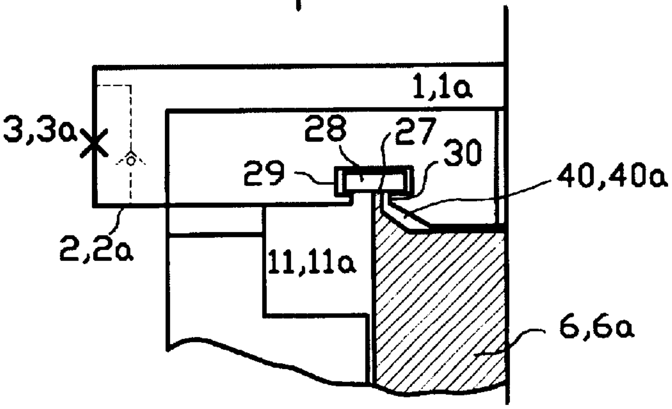

In the alternative embodiment of FIG. 3*a* the valves 5 and 5*a*are left out and in the starting position the spaces 40 and 40*a* are not connected to low pressure. A stable top position in this embodiment is among others achieved by means of a shut tight sealing from channel 26 and 25 to the space 40, 40*a* above the plungers 6 and 6*a*, which sealing is also such that the plungers will start immediately when there is pressure in the spaces 40 and 40*a*.

FIG. 3*a* shows how a shut tight sealing can be achieved by applying elastic sealing materials and such a constructive design that the plungers will start immediately when valve 3 is opened. The sealing ring 28, which is enclosed in the groove 29, is made of elastic material which seals against the narrow sealing edge 27 of plunger 6 or 6*a*. In a pressureless situation, this ring 28 (which may also be an enclosed O-ring) in the top position of the plungers 6 and 6*a* springily abuts the upper edge 27 of the plungers 6 or 6*a* and the edges of the slit 30 between the plunger edge 27 and the top edge of the plunger cylinder. The sealing ring 28 is pressed down by the pressure in the space 11 or 11*a* and therewith closes off the slit 30 shut tight. Because the sealing edge 27 can be very narrow here and thus the top surface of the sealing edge very small, the plunger experiences only a small force directed downwards in the starting position as a result of the high pressure in space 11 or 11*a*. As soon as high pressure is admitted in the space 40 or 40*a* above the plunger via control valve 3 a pressure balance is created over the sealing ring which no longer seals as a result, so that the spaces 11, 11*a* and 40, 40*a* are connected to each other and the downward plunger movement is started immediately.

In a second alternative embodiment the adjustment plungers are designed as normal control plungers 6 and 6*a* which move in the accompanying plunger cylinders. Quick switching auxiliary valves SHV 1 and 2 are accommodated in the channels 25 and 26. These SHV valves are switch valves with a large passage which can be opened very quickly. The starting is done such that for instance first channel 26 is brought under pressure in the manner described above, the valve SHV2 being closed. In order to start plunger 6*a*, SHV2 is opened.

As soon as subsequently channel 26 comes in connection with low pressure PI in the manner described before, the plunger 6*a* will move upwards under influence of the spring under said plunger. In the top position of the plunger the valve SHV2 closes with which the starting position is reached again. The valve SHV2 can also close before the upgoing plunger has reached the top position when the valve SHV2 is bridged by a non-return valve which only admits flow from the plunger cylinder. The further working of this embodiment with the SHV valves corresponds to the working of the embodiment according to FIG. 3. Only the starting of the valve spools is different. An advantage of this alternative starting method can be that the plungers 6 and 6*a* in principle can be started directly from each position and thus can be better used as buffer plungers for the upward movement.

In the aforementioned description of the embodiment of the valve combinations OD two valves were always taken as starting point, which valves switched the supply and discharge from and to each other's adjustment or control plunger 6 and 6*a* via the channels 25 and 26. It is possible however to use a separate third valve as switch valve in order to simultaneously switch both channels 25 and 26 from high pressure to low pressure near both ends of the stroke of valve O or D2. The number of necessary valves then goes up to three. The third valve can be a simple pressure controlled switch valve but it may also have the same design as the described OD valves.

In this case, however, the requirement is made that during simultaneous moving back the valve spools of the valves O and D to the top starting position, no short-term connection may be created between the high pressure connection Ph and the pipe 4 to the hydraulic machine (also see FIGS. 1 and 2). This requirement can be met by the known art for instance by dimensioning the valve spools and the gates and/or by enlarging the length of stroke of the valve spool for one and/or both valves. In the embodiment of FIG. 3 the dimensioning is already such that said requirement is met, because at the simultaneous moving back of the valve spools to the top starting position the pipe 4 and gate 17*a* are indeed closed by valve D at the moment that the gate 15 is connected to high pressure Ph by valve O.

The advantage of the embodiment with three valves is that the valves O and D can switch simultaneously. This means that the open period of the valve combination OD (or the closed period of the combination O2 and D2) can be controlled from unlimitedly long to nil. The minimum pulse length can therefore be unlimitedly reduced here.

In the embodiment with two valves from FIG. 3, which was elucidated above, the minimal pulse length is determined by the time necessary for activating the second valve O after the first valve D has started. This time in itself is very short already and may be further reduced by dimensioning the first valve such that the valve D switching first, in comparison to the second valve O, after the starting signal needs a little more time to open the actual main valve. The latter can be realised on the basis of the known art by the correct dimensioning or for instance by giving the first valve D a relatively longer plunger stroke and/or by making the diameter of the plunger 6*a* smaller than the diameter of plunger 6. In the dimensioning given in FIG. 3, for instance with a reduction of the plunger surface of plunger 6*a* to half the plunger surface of plunger 6 it will already be obtained that the minimal pulse length can be reduced to almost nil.

Figure 3B:
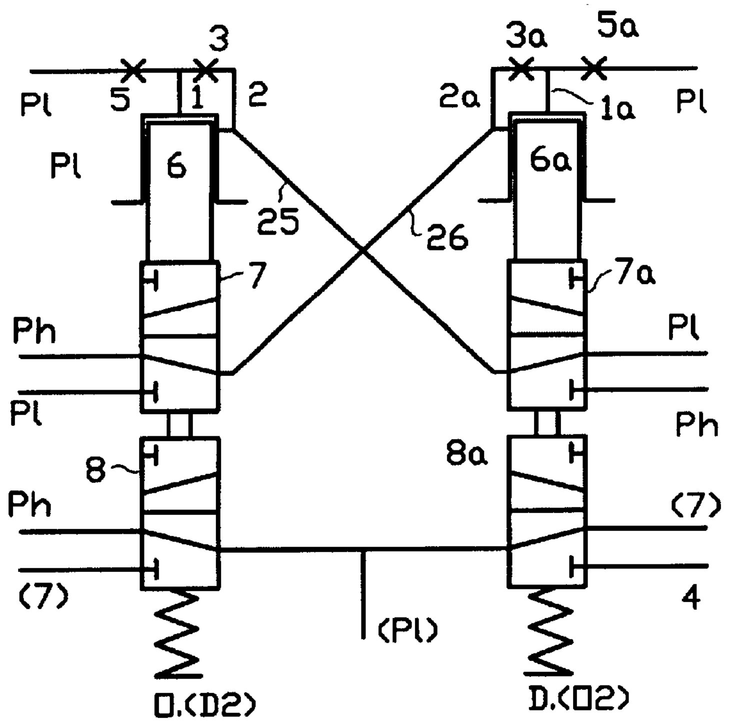

FIG. 3*b* shows a schematical view of the embodiment of FIG. 3.

Figure 3C:
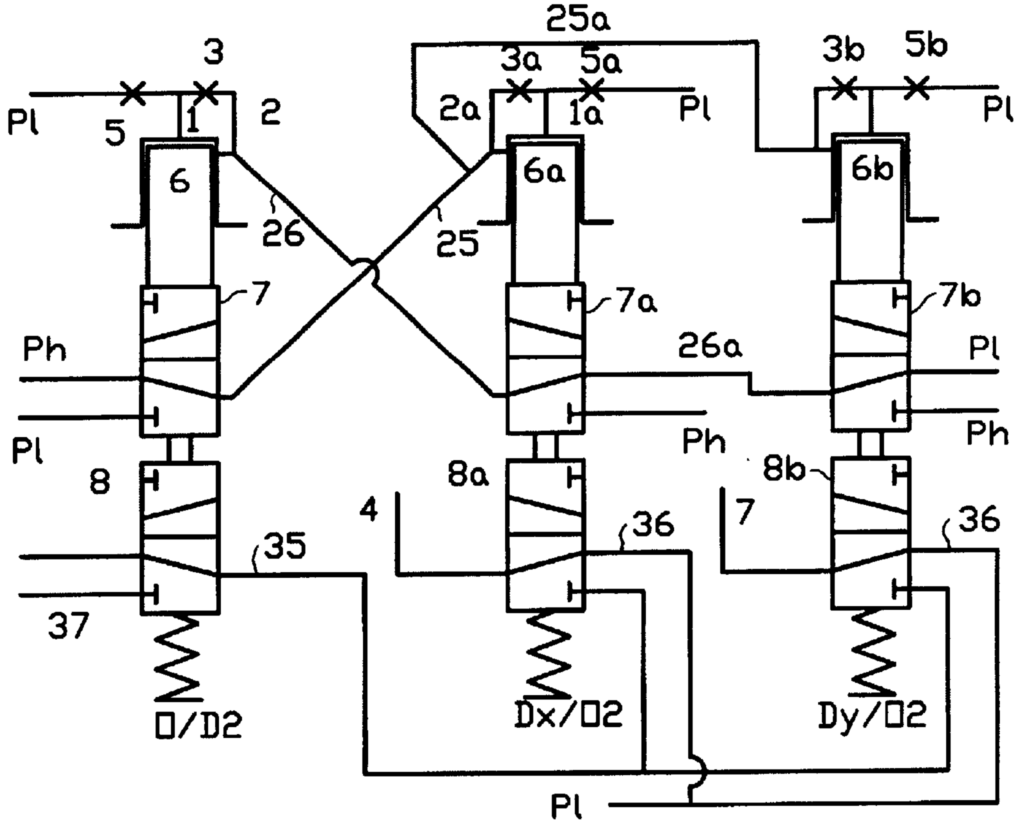

FIG. 3*c* schematically shows how the embodiment according to FIG. 2*e* (and FIG. 2*f*) with three valves O/D2, Dx/O2 and Dy/O2 can be realised with valve embodiments which are similar in construction to the embodiments which have already been described with FIG. 3, which description is referred to here.

Valve O/D2 enforces in the drawn position of FIG. 3*e* both the adjustment plunger 6*a* of valve Dx/O2 via pipe 25 and the adjustment plunger 6*b* of valve Dy/O2 via pipe 25*a*.

In the bottom position each of the valves Dx/O2 and Dy/O2 can further connect the adjustment plunger 6 of valve O/D2 to high pressure Ph, and in the top position to the low pressure PI. When Dx/O2 takes care of the pressure supply from Ph by switching downwards, pipe 26 is directly connected to Ph (through the valve member 7*a*) via Dx/O2. When (with Dx/O2 in the top position) only Dy/O2 takes care of the pressure supply by switching downwards, pipe 26 is connected to Ph via Dx/O2, pipe 26*a* and Dy/O2 (valve member 7*b*). In this way valve O/D2 always cooperates with one of either valves Dx/O2 or Dy/O2. Here the three valves can in principle be entirely the same mechanically and also identical to the embodiment shown in FIG. 3, in which case series production with relatively large series becomes possible.

In the connection with three valve O, D and D3 shown before in FIG. 2*f*, three valves can take care of the pressure supply to each other's adjustment cylinders in a similar way as elucidated here for the valves OD2, DxO2 and DyO2, respectively.

In case the valves O, O2, D, D2, D3, O/D2, Dx/O2 and Dy/O2 are started in another way the same connection can be used as in FIG. 3*e* and 3*f*.

Figure 3D:
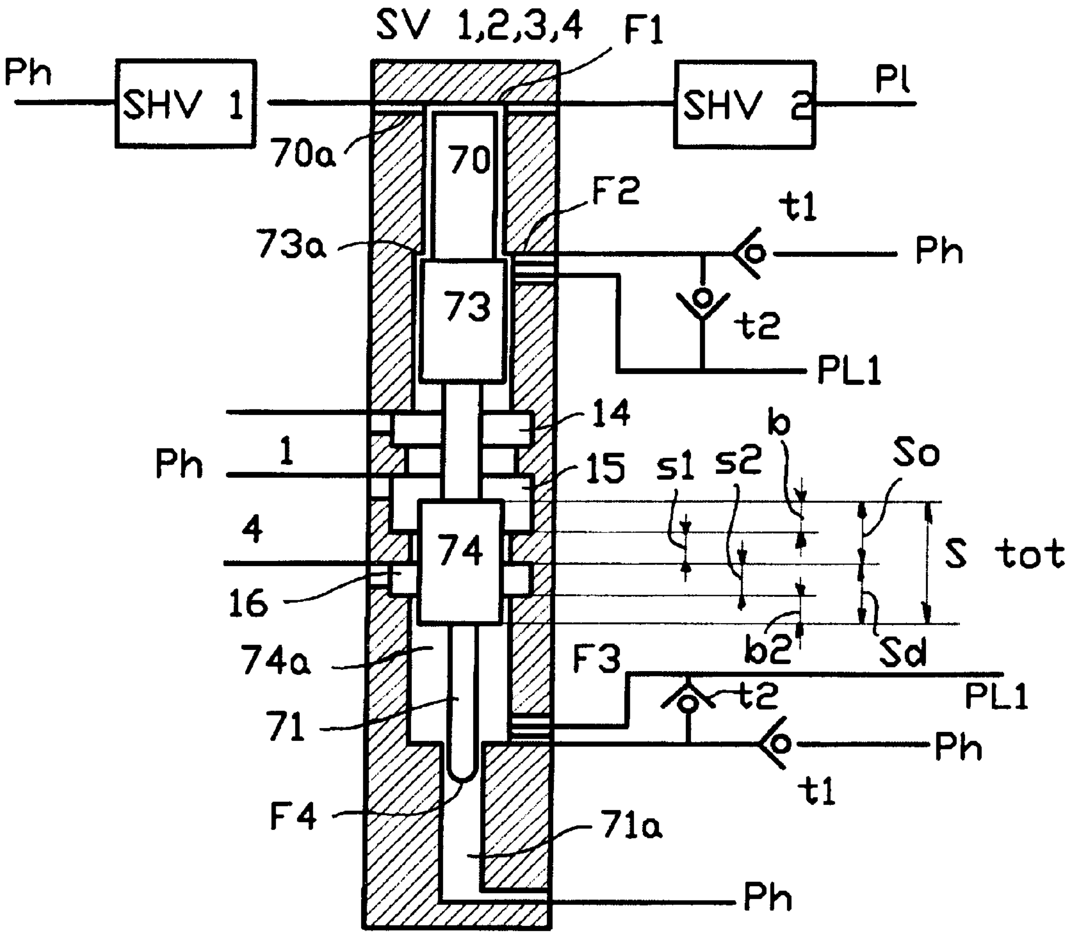

In FIG. 3*d* an embodiment is shown of the single quick switching valves SV1, SV2, SV3 and SV4 from the FIGS. 1 and 1*a*–1*e*. Here the valves are moved by two operation plungers 70 and 71 of different diameters. Buffering takes place with help of the buffer pistons 73 and 74 in a manner similar to the buffering of the valves O and D described above. The operation plungers 70 and 71 are energized via operable quick switching valves SHV1 and SHV2 which were mentioned above already. The working of the SV valve is as follows.

In the position as depicted the passage from the high pressure connection Ph via gate 15 and 16 to connection 4 is closed. Furthermore the auxiliary valves SHV1 and SHV2 are closed as well. After SHV1 is opened plunger 70 moves the valve spool downwards because said plunger has a larger cross-sectional surface than plunger 71 which is permanently under pressure Ph. After the valve spool has covered the switch path So, gate 16 just starts to open to pipe 4. After subsequently covering the distance S2 gate 16 is completely opened and there is a broad connection between Ph and pipe 4.

The remaining stoke length B2 is the maximum buffer stroke length in which the fluid from the buffer cylinder 74*a* is pressed to high pressure Ph via non-return valve t1. Because the diameter of the buffer plunger 74 is much larger than the driving plunger 70 the valve spool comes to a standstill very quickly the kinetic energy being converted into useful supply of energy back to a high pressure level Ph.

After the valve spool has come to a complete standstill the pressure in space 70*a* rises to Ph after which SHV1 closes. In order to lift the valve spool again and to thus end the supply pulse, SHV2 is opened. As a result the valve spool goes up under influence of the high pressure in plunger cylinder 71*a*. Switching and buffering takes place in a manner similar to the manner described above. Subsequently valve SHV2 closes with which the starting position is reached again.

An advantage of said SV valve is that only one valve spool 70, 73, 74, 71 will suffice. An objection is that the minimum open and closed period is relatively long with regard to the combination valves OD, because after the starting signal, SHV1 has to react first and subsequently the SV valve has to make a complete stroke before the starting signal can be given to SHV2 for the closing movement. This series connection of activities hampers reaching the wanted very short opening or closing pulse.

Regarding the control of the devices and valves described above the following can be mentioned.

In almost all cases an intelligent electronic control is required. This control is aimed at controlling particularly speed and location of the movements which are effected by the hydraulic machine. Speed here can be derived from the velocity of flow of the hydraulic medium but also directly from the number of revolutions of the driving hydro engine or the speed of the piston rod. As auxiliary signal for the control other signals can also be introduced such as the acceleration of parts of the device driven by the hydraulic machine. In order to obtain the maximum energetic efficiencies that can be obtained with a DHPT device it may be necessary to also feed in the momentary velocity of the hydraulic medium close to the quick switching valves SV or the valve combinations OD and/or the momentary pressure near the connections of the hydraulic machine as a signal. Bearing the very dynamic nature of the digital hydraulic pressure transformation in mind, particularly the speed of response of the measurements are important with the pressure and velocity readers. The control varies the pulse length and the pulse frequency of the deceleration and supply pulses and operates the return valves present. The embodiment of the possible controls will not be further gone into.

It is noted that the switching device with the combination valves OD may have a broader use than the uses described above for the DHPT devices and devices for driving hydro engines with intermittently working valves. For instance supply pulses of constant length and variable frequency could also be realised with these combination valves OD. A constant pulse length is obtained then with a valve combination DO which is series connected, in which the valve spools start simultaneously but in which valve O closes later than the moment on which D opens. The latter can be reached by a slower movement of the valve spool of O and/or a certain placing and dimensioning of the valve gates and/or for instance by a difference in stroke length of the valve spools. Because valve D always opens a same period of time earlier than valve O closes a constant opening or supply pulse is created. After a variable time subsequently the D valve and after that the O valve is moved back to the starting position. Moving back can take place gradually by a movement which is generated by for instance a rotating cam disc, the cam being formed such that in a certain position of the driving shaft both valve spools of O and D are simultaneously released and start to move downwards under influence of a force directed downwards which is exerted for instance by a spring present to that end. Subsequently the valves are moved back in the desired manner by the moving cam. The number of pulses in this device will be proportional to the number of revolutions of the cam disc whereas the pulse length remains constant. These pulses can for instance be used as starting pulses for a free piston engine, as for instance described in patent application PCT/NL96/00157 dated Oct. 4, 1996. In this way among others the frequency of the free piston engine will become proportional to the number of revolutions of the shaft which drives the cam disc and which can also be used for driving auxiliary machines, particularly the auxiliary machines which preferably have to be driven with a number of revolutions synchronous to the stroke frequency of the free piston engine. For the latter a scavenging pump can for instance be thought of here and of a lifting pump with which hydraulic medium is pumped up from the existing reservoir with atmospheric pressure to the pressure tank with low system pressure Pl1 of for instance 10 bar.

Figure 4A:
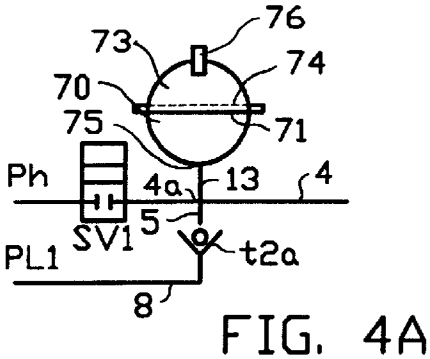

FIG. 4*a* gives a view of the anti cavitation accumulator ACA mentioned before. This ACA is characterized in that the pressure which the accumulator can exert on the fluid, has been maximized to a pre-determined pressure which is equal or lower than system pressure present on the spot. The ACA, in the figures which deal with a so-called "high pressure ACA", is connected directly via a short and broad pipe 13 to the point 4*a* in pipe 4 directly behind the quick switching valve SV1. The ACA is also connected to the low pressure reservoir with a pressure Pl1 of for instance 10 bar via the non-return valve t2*a*. The accumulator space 70 below the accumulator membrane 71 is filled with hydraulic medium under pressure Pl1. The accumulator space 73 above the accumulator membrane is the gas volume of the ACA. This gas volume has a pressure which depends on the pre-pressure of the ACA. Here the pre-pressure or filling pressure Pv is the pressure which the ACA can maximally exert on the connected hydraulic medium. In the depicted embodiment this is the pressure prevailing in the gas space 73 in the situation where the membrane 71 abuts the perforated or porous support plate 74. Said pre-pressure Pv is smaller or equal to the lowest system pressure which has a value of Pl1 here. Because Pv is smaller than or equal at the most to Pl1 the membrane 71, in the starting situation with an opened quick switching valve SV1 and a high pressure Ph in pipe 4, is pressed forcefully to the perforated or porous support plate 74. The fluid in pipe 4 flows with high speed to the right to the hydraulic machine. As soon as the quick switching valve SV1 is closed a very large fluid reduction arises from point 4*a* to the pipe 4 as a result of which the pressure in point 4*a* will drop exceptionally quick. When the pressure in point 4*a* gets below a level Pl1 then fluid will start to flow from the reservoir with pressure Pl1 via pipe 8 and 5 and the non-return valve t2 to point 4*a*. Because of this flow a pressure drop will now occur in the pipe 8 and in pipe 5. When this pressure drop becomes larger than the value Pl1-Pv the pressure in the accumulator connection 75 drops below the level Pv, as a result of which fluid starts to flow from the ACA to point 4*a*. Because the pressure drop over the very short and broad pipe part 13 is very small the supply speed from the ACA to point 4*a* can temporarily be very high, as a result of which the pressure in point 4*a* cannot drop far below the accumulator level Pv, so that cavitation in point 4*a* is prevented. While point 4*a* is mainly filled from the ACA, fluid also keeps flowing from the low pressure reservoir with pressure Pl1 via pipe 8 to point 4*a*. As soon as the fluid flow from point 4*a* to the hydraulic machine via pipe 4 has sufficiently dropped (as a result of the pressure difference between the pressure at the location of the connected hydraulic machine and the pressure in point 4*a*) the inflow to point 4*a* at a certain moment exceeds the outflow as a result of which the pressure in point 4*a* rises again and the supply from the ACA drops. When the pressure in point 4*a* becomes higher than the pressure in the ACA fluid flows back in the ACA which subsequently is filled again from the low pressure reservoir to the pressure level Pl1. In that way the starting situation is restored again and the device is able to meet a next pressure drop in point 4*a*.

It is clear that the ACA provision is only suitable for short-term pressure lowerings and that after closing the quick switching valve there has to be sufficient time to fill the ACA again.

Figure 4B:
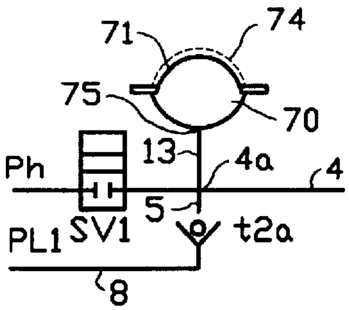

FIG. 4*b* shows a "high pressure ACA" of which the gas side is in open connection to the outside air. The gas pressure is constant and atmospheric as a result. Just like in the ACA from FIG. 4*a* the pressure in pipe 5 and in the ACA will rise to the highest pressure level Ph which will prevail in point 4*a* as soon as the quick switching valve SV1 opens. The ACA has to be able to withstand to this pressure level here as well and to that end is constructed relatively heavy and also the membrane 71 is pressed to the support plate 74 with larger force.

The advantage of this type of high pressure ACA is that the flow from the ACA to space 4*a* can take place unimpeded and practically without pressure loss. The high pressure ACA can thus react very quickly to the sudden pressure drops in point 4*a*. The maximum speed of reaction in this regard occurs when the ACA is placed as close to pipe 4 as possible, which is shown in FIG. 4*g*. Here the ACA has the shape of an insertable plug. The working of the ACA from FIG. 4*b* is similar to the one from FIG. 4*a*. The ACA from FIG. 4*b* is more simple because the filling valve 76 is lacking and the pre-pressure needs not to be set and adjusted. On the other hand the pre-pressure is lower than with the ACA from FIG. 4*a* as a result of which this ACA is a little less capable to meet extremely quick pressure drops in point 4*a*.

Figure 4C:
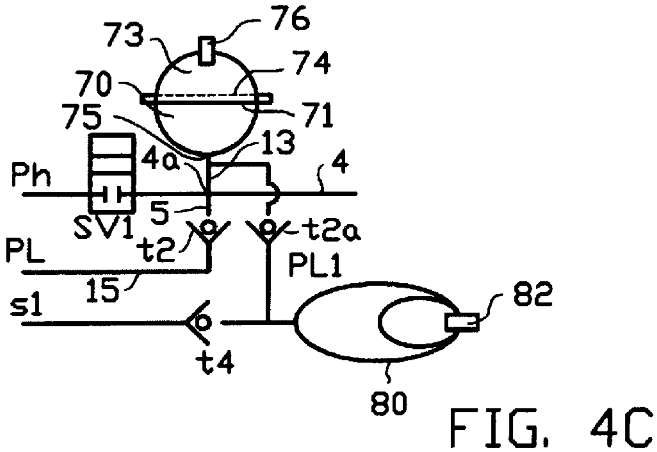

FIG. 4*c* shows a situation with two low pressure levels. A level Pl1 of for instance 10 bar in the auxiliary accumulator 8O and an atmospheric level of PI in the low pressure reservoir mentioned earlier. Because the pre-pressure of the ACA is not allowed to be higher than the lowest available system pressure PI on the spot, relatively little pressure is available for the supply to point 4*a*. In some cases this available pressure level is nonetheless adequate to ensure a sufficient fluid flow to point 4*a*.

In the figure a small second accumulator 8O is present which always prior to closing the quick switching valve SV1 has to filled to a level PI1.

This filling can for instance take place by connecting the supply pipes 81 to the exits of the buffer cylinders of the valves OD from FIG. 3 and additionally to have said buffer cylinders work as pump cylinders for the auxiliary accumulator 8O with known means during the switch stroke S1 (see FIG. 3). It is also possible to use the supply pulse for energizing the small plunger which drives a larger auxiliary plunger which serves to fill the auxiliary accumulator during the supply pulse.

As soon as the valve SV1 opens the situation can be compared to the situation described with FIG. 4*a* and FIG. 4*b*, respectively. The supply to point 4*a* then first mainly takes place from the ACA, subsequently mainly from the auxiliary accumulator 80.

A special situation may occur here in which the auxiliary accumulator 80 becomes exhausted. In that case the pressure in the auxiliary accumulator 80 drops. When the auxiliary accumulator is completely exhausted the pressure in point 4*a* drops to the level PI. At that moment there is the requirement that meanwhile the fluid velocity from point 4*a* has dropped to such an extent that the supply to point 4*a* from the low pressure reservoir, under influence of PI, can keep pace with it.

Figure 4D:
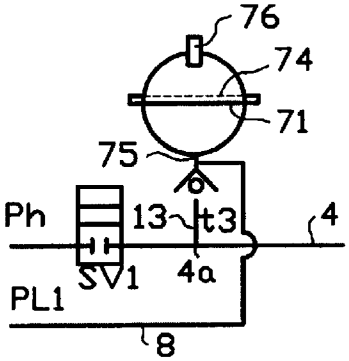
Figure 4E:
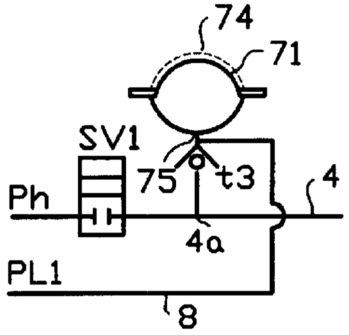

FIG. 4*d* and 4*e* show a "low pressure ACA". Because of the presence of the non-return valve t3 between point 75 and point 4*a* this ACA is no longer exposed to the occurring high pressure in pipe 4 when the quick switching valve SV1 is opened. The ACA can as a result be of a lighter construction but can meet the pressure drops in point 4 a little less well because the opening pressure of the non-return valve t3 has to be overcome for the inflow of fluid to point 4*a* and the mass of the valve body of that valve has to be accelerated. For the rest these ACA's work like those from FIGS. 4*a, b* and *c*.

Figure 4F:
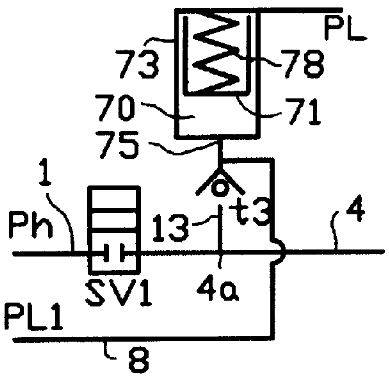
Figure 4G:
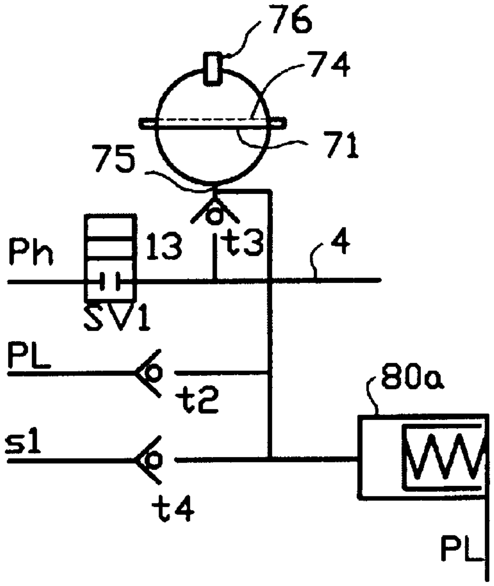

In FIG. 4*f* the ACA is designed as a spring accumulator instead of a membrane accumulator. The maximum pressure the ACA can exert on the fluid volume 70 is determined here by the force of the pressed in spring 78.

FIG. 4*g* can be compared here to FIG. 4*c* with this difference that the ACA is constructed here as low pressure ACA and that the auxiliary accumulator 80*a* is constructed as spring accumulator.

Figure 4H:
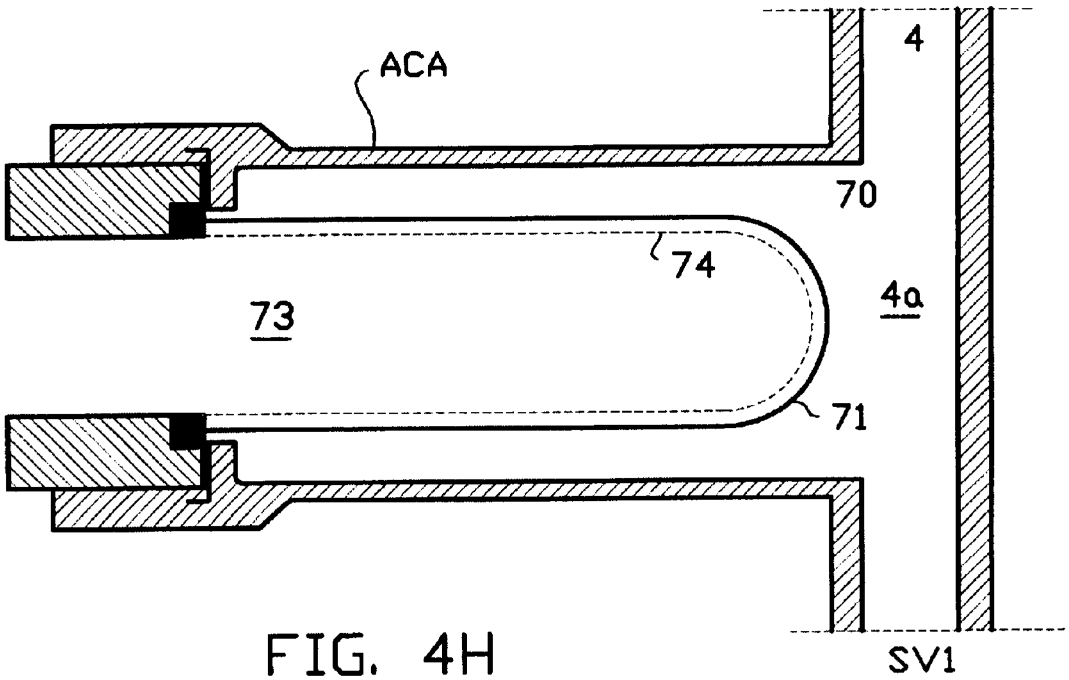

FIG. 4*h* shows a sketch-like view of a high pressure ACA which further is self-evident.

What is claimed is:

1. A system comprising a hydraulic reservoir and a hydraulic machine, said hydraulic reservoir and said hydraulic machine being connected with each other by means of a fluid connection line, and a switching device used for intermittent flow regulation between said hydraulic reservoir and said hydraulic machine, said switching device being arranged in the connection line, wherein said switching device comprises a first valve and a second valve, said first and said second valve being two position valves, said first valve being operable to be switched between a first position in which the first valve is closed and a second position in which it is open, and said second valve being operable after the first valve has been operated, to be switched between a first position in which the second valve is opened and a second position in which it is closed, said connection line being open when both said first and said second valve are in their open positions.

2. A system according to claim 1, wherein said hydraulic reservoir is a high pressure source and wherein said first and second valves are arranged in series along the connection line.

3. A system according to claim 1, wherein said hydraulic reservoir is a low pressure source and wherein the connection line has a first and a second branch which are parallel to each other, said first and second valves being arranged in said first and second branch, respectively.

4. A system according to claim 1, comprising a primary first valve and a secondary first valve, said primary valve being arranged parallel to said secondary first valve and located in the connection line between the second valve and a high pressure source, in series with said second valve, said secondary valve being located in a connection line extending between a low pressure source and said second valve, in series with said second valve.

5. A system according to claim 1, comprising a third valve, said second valve being arranged parallel to said third valve and located in the connection line between a high pressure source and the hydraulic machine, said first valve being located between said high pressure source and said second valve, said third valve being located in a connection line that extends between the hydraulic machine and a low pressure source, a first connection channel extending between said first valve and said third valve and a second connection channel extending between said low pressure source and said second valve, said second valve and said third valve being three-way valves, said second valve connecting the part of the connection line between said second valve and the hydraulic machine with the second connection channel in its first position and closing it in its second position, and said third valve being displaceable between a position connecting said first connection channel to the portion of the connection line that extends between the third valve and the hydraulic machine and a position closing that channel off and connecting the portion of the connection line that extends between the hydraulic machine and the third valve to the low pressure source.

6. A system according to claim 1, wherein said first and second valve each comprise a hydraulic adjustment cylinder/plunger assembly, the plungers being movable one after the other between a position in which the valve in question is closed and a position in which the valve in question is opened, the switching device comprising valves for operating said plungers.

7. A system according to claim 6, wherein the cylinder of the second valve has at least one additional connection being connectable by means of a switch valve functioning as a reversing valve to a high pressure source via said first valve for operating said second valve to move to the closed position.

8. A system according to claim 6, wherein the cylinder of the first valve has at least one additional connection being connectable by means of a switch valve functioning as a reversing valve to a low pressure source via said second valve for operating said first valve to move to the closed position.

9. A system according to claim 6, wherein the cylinders of the first and the second valve are connected to each other by a first additional connection being connectable by means of a switch valve functioning as a reversing valve, to a high pressure source for operating said first and said second valve to move to the second position, and to a low pressure source for operating said first and said second valve to move to the first position, respectively.

10. A system according to claim 6, wherein said first valve has an opening time that is greater than the opening time of the second valve.

11. A system according to claim 6, wherein said first and second valves each comprise at least one buffer piston with a diameter that is larger than the diameter of the respective plunger.

12. A system according to claim 6, wherein the cylinder of each first and second valve has a space above its plunger, said space being sealed in the upper or starting position of said plunger by means of an elastic or O-ring seal.

13. A system according to claim 6, wherein the cylinder of each first and second valve has a space above its plunger, said space being closed off from a space of low pressure in the upper or starting position of said plunger.

14. A system according to claim 12, wherein the plunger has an upper side which is provided with a narrow cylindrical collar protruding therefrom, and wherein in its upper side said cylinder has an annular groove facing said plunger upper side and having a connection with a further space which is connected to a high pressure source, said groove being provided with an elastic sealing ring, a slit being formed between said collar and said cylinder to form a connection between said groove and said space, said sealing ring closing off the connection between said groove and said space under the influence of the high pressure in said further space and releasing the latter connection under the influence of a high pressure in said space.

15. A system according to claim 1, wherein the portion of the connection line located between said switching device and said hydraulic machine is connected to a source of low pressure by means of a check valve, and wherein said portion of said connection line is also connected to an anti-cavitation accumulator having a pre-pressure equal to or lower than said low pressure, said accumulator having an input chamber having a movable wall member, said accumulator having means for limiting the movement of said movable wall member at a maximum pressure so as to make the inflow of fluid independent of the pressure in said chamber.

16. A system according to claim 15, wherein said accumulator has a membrane separating said chamber from a second, gas pressurized chamber, a support being provided at the gas pressurized chamber side of the membrane for supporting said membrane when said maximum pressure is present in said chamber.

17. A system according to claim 15, wherein said accumulator has a piston limiting said chamber, and a compression spring biasing said piston towards said chamber.

18. A system according to claim 1, further comprising an additional fluid connection line arranged parallel to the portion of the fluid connection line extending between the switching device and the hydraulic machine, said portion of said fluid connection line being provided with a valve for opening and closing it and said additional fluid connection line having a diameter smaller than said portion of said fluid connection line.

* * * * *